United States Patent
Waenninger et al.

(10) Patent No.: US 11,702,047 B2
(45) Date of Patent: Jul. 18, 2023

(54) METHOD AND DEVICE FOR CARRYING OUT A CLEANING OPERATION FOR A BRAKING DEVICE OF A BRAKING SYSTEM, AND VEHICLE SYSTEM

(71) Applicants: BAYERISCHE MOTOREN WERKE AKTIENGESELLSCHAFT, Müchen (DE); ZF ACTIVE SAFETY GMBH, Koblenz (DE)

(72) Inventors: Philipp Waenninger, Munich (DE); Tobias Oppermann, Hollnich (DE); Christian Redlich, Leipzig (DE)

(73) Assignees: BAYERISCHE MOTOREN WERKE AKTIENGESELLSCHAFT, Munich (DE); ZF ACTIVE SAFETY GMBH, Koblenz (DE)

( * ) Notice: Subject to any disclaimer, the term of this patent is extended or adjusted under 35 U.S.C. 154(b) by 366 days.

(21) Appl. No.: 16/968,461

(22) PCT Filed: Dec. 17, 2018

(86) PCT No.: PCT/EP2018/085279
§ 371 (c)(1),
(2) Date: Aug. 7, 2020

(87) PCT Pub. No.: WO2019/154547
PCT Pub. Date: Aug. 15, 2019

(65) Prior Publication Data
US 2020/0398799 A1 Dec. 24, 2020

(30) Foreign Application Priority Data
Feb. 9, 2018 (DE) ...................... 10 2018 102 923.3

(51) Int. Cl.
*B60T 7/12* (2006.01)
*B60T 13/66* (2006.01)
*F16D 65/00* (2006.01)

(52) U.S. Cl.
CPC .............. *B60T 7/12* (2013.01); *B60T 13/662* (2013.01); *B60T 2201/06* (2013.01); *B60T 2201/124* (2013.01); *F16D 65/0037* (2013.01)

(58) Field of Classification Search
CPC ...... B60T 7/12; B60T 13/662; B60T 2201/06; B60T 2201/124; F16D 65/0037; F16D 65/0043; F16D 65/0025
See application file for complete search history.

(56) References Cited

U.S. PATENT DOCUMENTS

| | | | |
|---|---|---|---|
| 9,505,384 B2 * | 11/2016 | Ljungdahl | ........... F16D 65/0037 |
| 9,963,129 B2 * | 5/2018 | Betz | .......................... B60T 8/17 |
| 2005/0124462 A1* | 6/2005 | Wagner | ................. B60T 17/221 |
| | | | 477/182 |

FOREIGN PATENT DOCUMENTS

| | | |
|---|---|---|
| DE | 4427170 C1 | 10/1995 |
| DE | 10111076 B4 | 12/2001 |

(Continued)

OTHER PUBLICATIONS

British Patent No. GB 2478355 to Langli et al published on Sep. 7, 2011.*

(Continued)

*Primary Examiner* — Pamela Rodriguez
(74) *Attorney, Agent, or Firm* — Blueshift IP, LLC; Robert Plotkin

(57) ABSTRACT

The invention relates to a method for carrying out a cleaning operation for at least one braking device of a braking system in a motor vehicle, said method having the following steps:
setting a braking pressure by components of the braking device in accordance with a predefined braking pressure curve, wherein the braking pressure curve, during the cleaning operation, specifies braking pressures that vary over time for the braking device,
correcting a setpoint motor torque that is to be provided by a drive motor of the motor vehicle and that is dependent on a braking effect brought about by the set braking pressure,
the predefined braking pressure curve being selected such that a longitudinal deceleration of the motor vehicle, which is brought about by the predefined braking pressure curve, can be compensated for by a corresponding additional motor torque.

12 Claims, 3 Drawing Sheets

(56) References Cited

FOREIGN PATENT DOCUMENTS

| DE | 10338564 A1 | 3/2005 |
|---|---|---|
| DE | 102012213550 A1 | 2/2014 |
| DE | 102012213552 A1 | 2/2014 |
| DE | 102013203824 A1 | 9/2014 |
| DE | 102016007436 A1 | 12/2017 |
| GB | 2523199 A | 8/2015 |
| WO | 2000055024 A1 | 9/2008 |
| WO | 2011085841 A1 | 7/2011 |

OTHER PUBLICATIONS

British Patent No. GB 2498794 to Reynolds et al published on Jul. 31, 2013.*
Korean Patent No. KR 10-2020-0058839 published on May 28, 2020.*
International Search Report & Written Opinion dated Apr. 3, 2019 in international patent application No. PCT/EP2018/085279, 12 pages (English translation pp. 8-12).

* cited by examiner

METHOD AND DEVICE FOR CARRYING OUT A CLEANING OPERATION FOR A BRAKING DEVICE OF A BRAKING SYSTEM, AND VEHICLE SYSTEM

TECHNICAL FIELD

The invention relates to braking systems for motor vehicles with friction brakes, in particular measures for cleaning brake surfaces, such as for example a brake disk, a braking device in a braking system.

TECHNICAL BACKGROUND

Due to the open design of friction braking devices in motor vehicles, liquids, snow, ice or dirt can be deposited on components of the braking device, such as for example a brake disk or other brake surface. These deposits have a significant impact on the braking behavior. In particular, the response behavior of the braking devices is noticeably impaired by deposits, wherein ice deposits in particular on the brake surfaces can significantly impair the braking performance. The deterioration in the performance of braking devices due to deposits is particularly pronounced in the case of CSIC brake disks.

Cleaning cycles are therefore provided in friction braking devices, as a result of which deposits are removed from the brake surfaces. In the cleaning cycles, the brake pads are usually pressed against the brake surface at low pressure for a predetermined period of time in order to clean the brake surfaces by scraping and/or evaporation.

For example, it is known from the document DE 44 271 70 C1 to determine with the aid of a sensor device that dampness which influences the braking effect is present. A temporary braking operation is then carried out on at least this brake in such a way that the deceleration of the vehicle is not noticeable to the driver for reasons of comfort. In particular, for this purpose the braking pressure is regulated so that the vehicle deceleration does not exceed a specific predetermined value. The cleaning cycle is usually repeated at regular intervals, in particular in time periods when the vehicle is moving at a constant speed.

For reliable cleaning of the brake surfaces of braking devices, however, braking pressures which lead to a noticeable deceleration of the motor vehicle are often necessary.

A cleaning method for a braking device is known from the document DE 10 2012 213 550 A1, in which a braking pressure is set for a predetermined wiping period for a drying operation, wherein the braking pressure and the wiping period are corrected by a determined offset value after the drying operation. Relevant driving dynamics data, in particular the determined longitudinal acceleration of the vehicle and/or the wheel acceleration of the wheels subjected to the braking pressure, are used as a basis for determining the offset value.

From the document DE 101 11 076 B4 a method for ensuring the braking effect of brake actuators arranged in a vehicle is known, wherein the brake actuators for removing the pads are activated in a cleaning cycle in such a way that a vehicle deceleration is set that is perceptible to the driver or is hardly perceptible to the driver. The braking force is set by regulating the braking pressure. To compensate for any loss of speed that may occur, it is proposed to increase the motor torque accordingly by increasing the amount of fuel supplied.

From the document WO 2000/055024 a method for variable adjustment of the braking force in a hydraulic braking system of a motor vehicle is known, in which a braking pressure is generated which acts on a wheel braking device. An actual coefficient of friction between the brake disk and the brake pad of at least one wheel brake is determined and compared with a predetermined setpoint coefficient of friction. If the actual coefficient of friction unacceptably undershoots the setpoint coefficient of friction, the braking pressure is increased, provided that the actual coefficient of friction is within a defined coefficient of friction stabilization range.

It is an object of the present invention to reliably carry out a cleaning cycle for a braking device of a motor vehicle, so that no noticeable vehicle deceleration occurs.

DISCLOSURE OF THE INVENTION

This object is achieved by the method for carrying out a cleaning operation for at least one braking device of a braking system in a motor vehicle according to claim 1 and by a corresponding device and a vehicle system according to the independent claims.

Further embodiments are specified in the dependent claims.

According to a first aspect a method for carrying out a cleaning operation for at least one braking device of a braking system in a motor vehicle is provided, comprising the following steps:

Setting a braking pressure by components of the braking device in accordance with a predefined braking pressure curve, wherein the braking pressure curve, during the cleaning operation, specifies braking pressures that vary over time for the braking device, Correcting a setpoint motor torque that is to be provided by a drive motor of the motor vehicle and that is dependent on a braking effect brought about by the set braking pressure, the predefined braking pressure curve being selected such that a longitudinal deceleration of the motor vehicle, which is brought about by the predefined braking pressure curve, can be compensated for by a corresponding additional motor torque.

One idea of the above method is to limit the increase in braking pressure in a cleaning operation of a braking device by specifying the braking pressure curve, so that a longitudinal deceleration of the motor vehicle brought about by the braking pressure can be compensated for or corrected by a corresponding additional motor torque. The braking pressure curve is thus predetermined such that a resulting change in the longitudinal acceleration or deceleration can be compensated for by changing the setpoint motor torque for the drive motor of the motor vehicle. In particular, the predetermined braking pressure curve is determined in such a way as to predetermine only braking pressure gradients which lead to changes in the longitudinal accelerations which can be compensated for by the dynamic behavior of the drive motor.

This ensures that a compensating motor torque can always be set at the beginning of the cleaning operation when the braking torque increases, so that the driver does not notice any impairment of the driving comfort at any time during the cleaning operation, in particular even when it starts. In particular, this method also enables the cleaning operation to be used in dynamic vehicle operation, i.e. also when the motor vehicle is accelerated or decelerated by corresponding driver behavior or pedal actuation.

According to one embodiment, the braking pressure curve can have one or more rise phases with a rising braking pressure and one or more plateau phases, each with a constant braking pressure. The predetermination of such a braking pressure curve has the advantage that the braking pressure is only gradually increased. Thus a high braking torque can be avoided with only slight contamination of the braking device, in which the setpoint motor torque would have to be increased considerably to compensate for the resulting vehicle deceleration. Thus the predetermination of the above braking torque curve can result in fuel savings.

In particular the one or more rise phases of the braking pressure curve can each be predetermined with a time period between 3 and 10 seconds in which the braking pressure rises monotonically, in particular linearly.

In particular the one or more plateau phases of the braking pressure curve can each be predetermined with a time period between 3 and 10 seconds.

Furthermore, the braking pressure curve can be provided as a function of an actual brake characteristic value that indicates an instantaneous braking effect in that a respective plateau value of the braking pressure predetermined by the braking pressure curve during the plateau phases is predetermined as a function of an actual braking characteristic value occurring during the respectively preceding rise phase or an actual braking characteristic value occurring during a respectively preceding plateau phase, or a duration of a respective plateau phase predetermined by the braking pressure curve as a function of an actual braking characteristic value occurring during the respectively preceding rise phase or during a respectively preceding plateau phase, or a respective plateau value for a next plateau phase of the braking pressure curve and/or the duration thereof is predetermined as a function of a difference between the actual braking characteristic and the predetermined setpoint braking characteristic, which specifies a predetermined braking effect.

It can be provided that the setpoint motor torque to be set is corrected by the drive motor of the motor vehicle with the aid of a longitudinal acceleration control, which sets the setpoint motor torque as a function of a deviation between a predefined setpoint longitudinal acceleration specification and an actual longitudinal acceleration specification, wherein the setpoint longitudinal acceleration specification in particular specifies a longitudinal acceleration of the motor vehicle upon activation of the cleaning operation or is determined from an accelerator pedal position during the cleaning operation. This enables the braking device to be cleaned independently of an accelerator pedal position or an acceleration behavior of the motor vehicle at the start of the cleaning operation.

According to one embodiment, the actual brake characteristic value can be specified by a ratio between a longitudinal deceleration brought about by the set braking pressure and a braking pressure applied thereto, or by a ratio between a differential motor torque to be set due to the correction and a braking pressure applied thereto.

It can be provided that the cleaning operation is started when one or more activation conditions are present, wherein the activation conditions comprise the following criteria:
the vehicle is moving on a level route;
the vehicle is moving with constant acceleration;
the vehicle is moving at a minimum speed;
the brake pedal is not actuated;
the position of the accelerator pedal does not change by more than a predetermined accelerator pedal change threshold;

a predetermined time period or a predetermined distance traveled has been reached or exceeded since the end of the last cleaning operation, wherein the predetermined time period or the predetermined distance traveled depends in particular on ambient conditions.

The cleaning operation can be ended when an actual braking characteristic value which specifies an instantaneous braking effect corresponds to a predetermined setpoint braking characteristic value which specifies a predetermined braking effect.

Furthermore, the cleaning operation can be ended in that the braking pressure is reduced in accordance with a predetermined chronological braking pressure reduction curve and the braking effect brought about by the currently set braking pressure is corrected by the setpoint motor torque to be set by the drive motor of the motor vehicle.

In particular, the chronological braking pressure reduction curve can correspond to a linearly falling braking pressure curve, in particular up to a braking pressure of 0.

According to a further embodiment, the cleaning operation can be terminated if one or more termination conditions are present, wherein the termination conditions comprise the following criteria:
the position of the accelerator pedal changes by more than a predetermined accelerator pedal change threshold value;
actuation of the brake pedal is recognized;
a termination signal is received from another vehicle system.

According to a further aspect, a device, in particular a brake control unit, for carrying out a cleaning operation for at least one braking device of a braking system in a motor vehicle, in particular according to one of the above methods, wherein the device is designed to:
set a braking pressure by components of the braking device in accordance with a predetermined braking pressure curve, wherein the braking pressure curve predetermines braking pressures that vary over time for the braking device; and
to provide a cleaning mode signal indicating activating or activation of a cleaning operation.

According to a further aspect, a vehicle system for carrying out a cleaning operation for at least one braking device of a braking system in a motor vehicle, in particular according to one of the preceding methods, wherein the vehicle system comprises:
a braking system with a brake control unit which is designed to set a braking pressure by components of the braking device in accordance with a predetermined braking pressure curve, wherein the braking pressure curve specifies braking pressures that vary over time for the braking device; and
a drive system with a motor control unit which is designed to correct a setpoint motor torque to be set by a drive motor of the motor vehicle in accordance with a braking effect brought about by the set braking pressure.

BRIEF DESCRIPTION OF THE DRAWINGS

Embodiments are explained in greater detail below with reference to the accompanying drawings. In the drawings.

DESCRIPTION OF EMBODIMENTS

Figure 1:
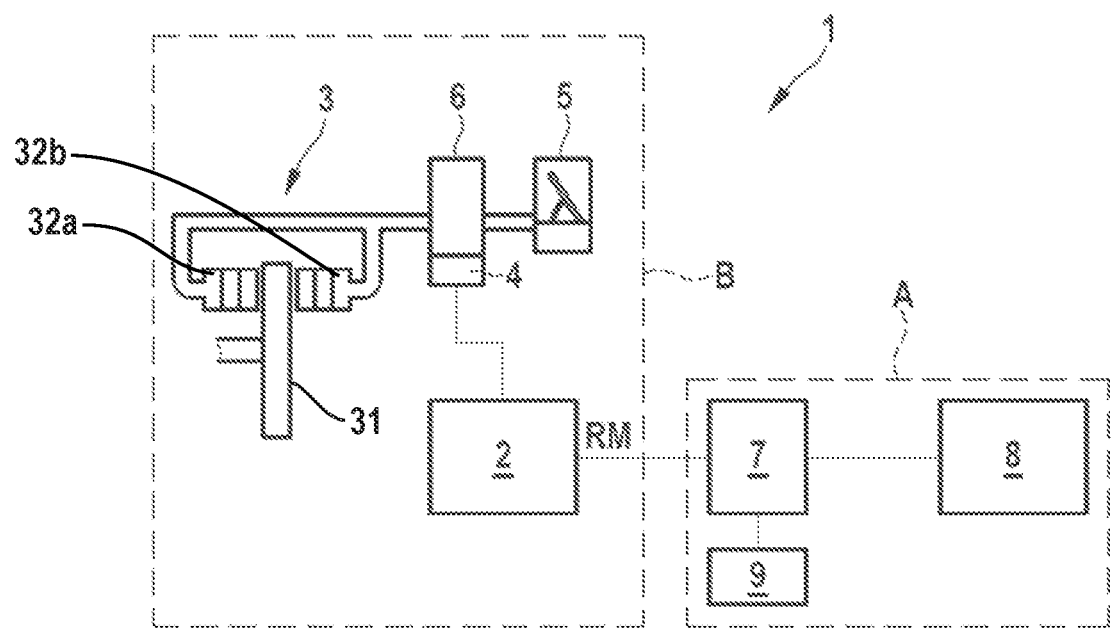
FIG. 1 shows a schematic representation of a vehicle system in a motor vehicle.

FIG. 1 shows a schematic representation of a vehicle system 1 for a motor vehicle. The vehicle system 1 has a braking system B with a brake control unit 2 and with one or more braking devices 3 connected thereto (only one shown in FIG. 1). The braking devices 3 can be designed in the form of friction brakes, in particular disk brakes.

The braking device 3 has components which are movable relative to one another and which can be pressed against one another with a braking pressure in order to bring about a frictional force. In particular, the braking device 3 can have a brake disk 31 and two brake shoes 32a and 32b that can be pressed hydraulically against the brake disk 31. The frictional force brings about the braking torque which acts on a wheel connected to the braking device 3. The brake control unit 2 is designed to predetermine the braking pressure that is set by a brake actuator 4. The control takes place in such a way that the brake shoes 32a and 32b are pressed by the braking pressure onto a friction surface of the brake disk 31 in order to achieve a braking effect.

In normal operation, the braking pressure is predetermined via a brake pedal 5, via which the driver can predetermine a desired braking pressure or a desired braking torque. The brake pedal 5 is connected to a brake booster unit 6 that is known per se in order to boost a pedal pressure exerted via the brake pedal 5 and to provide a (boosted) braking pressure which is dependent thereon. Furthermore, the brake actuator 4 of the brake booster unit 6 can be controlled separately by the brake control unit 2 in order to set a braking pressure independently of the pedal pressure.

Furthermore, the brake control unit 2 can be connected to a drive system A of the motor vehicle with a motor control unit 7 and a drive motor 8. The motor control unit 7 is designed to control the drive motor 8 as a function of an existing setpoint motor torque in such a way that the setpoint motor torque is provided as a real motor torque by the drive motor 8, in particular with the aid of a torque regulation.

The brake control unit 2 can be designed to provide the motor control unit 7 with a cleaning mode signal RM, by means of which it is recognized in the motor control unit 7 whether a cleaning operation has been activated or a cleaning operation is being carried out.

The motor control unit 7 can be designed to activate a longitudinal acceleration control when a cleaning operation is present in the braking system B. For this purpose, a longitudinal acceleration sensor 9 can be provided in the drive system A in order to provide a longitudinal acceleration specification. The longitudinal acceleration specification can also be provided via a communication system of the motor vehicle such as, for example, a vehicle communication bus.

For the longitudinal acceleration specification, a longitudinal acceleration specification can be assumed as the setpoint specification (setpoint longitudinal acceleration specification), which corresponds to a longitudinal acceleration immediately before the activation of the cleaning operation in the braking system B or which predetermines a defined longitudinal acceleration value, for example of 0.

Due to the longitudinal acceleration control as a result of the braking intervention of the cleaning operation an additional differential motor torque $\Delta M$ is set by the motor control unit 7, so that a corresponding differential motor torque is added to a propulsion torque required, for example, by a position of an accelerator pedal. The differential motor torque $\Delta M$ corresponds to a motor torque applied by the longitudinal acceleration control in addition to the motor torque currently to be set, which is intended to compensate for the effect of a braking intervention. The differential motor torque $\Delta M$ corresponds to the braking torque brought about in the stationary case of the longitudinal acceleration control.

Figure 2:
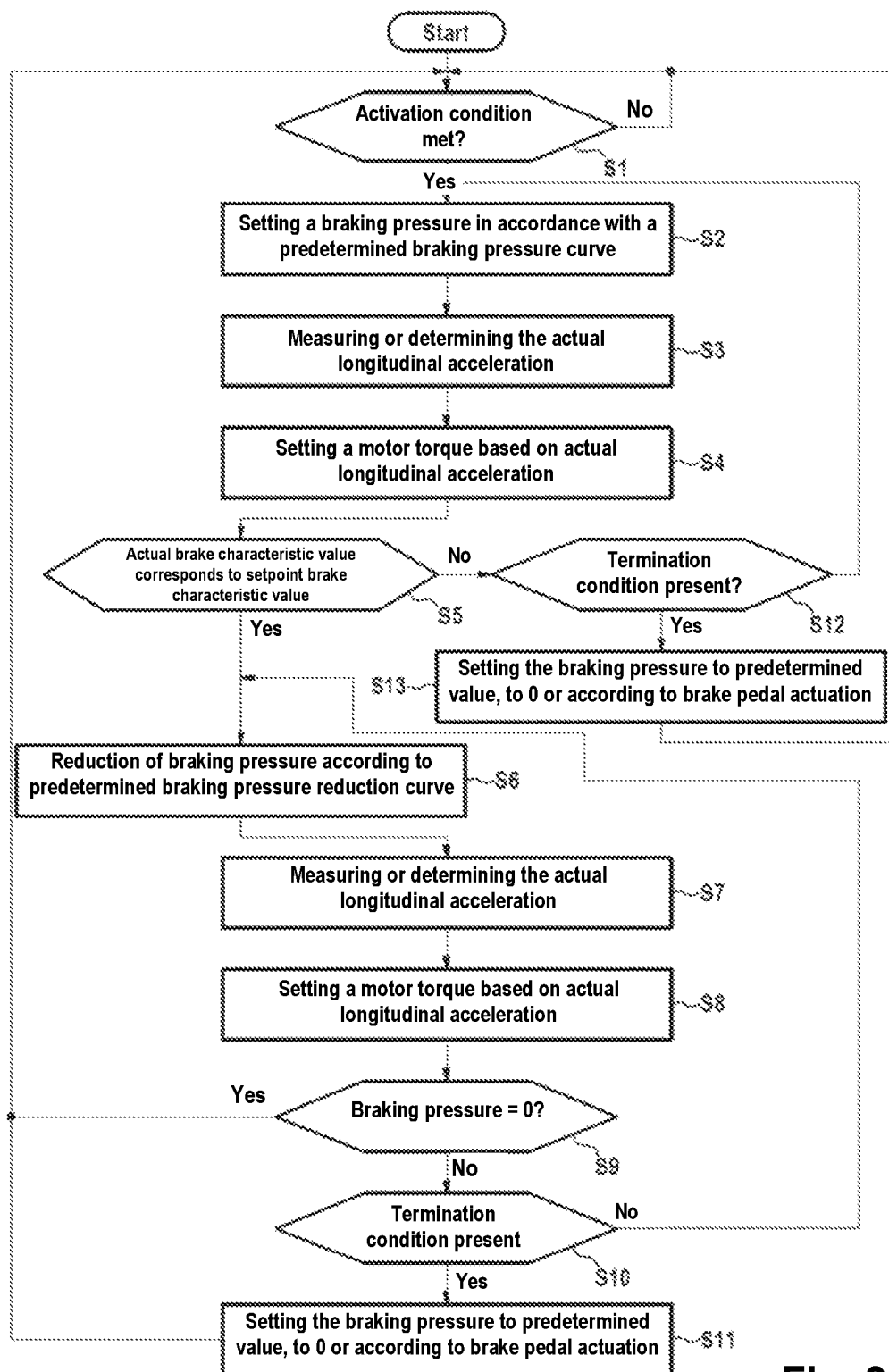
FIG. 2 shows a flowchart to illustrate a method for operating the vehicle system.

FIG. 2 shows a flowchart to illustrate a method for operating the brake control unit 2 or the vehicle system 1.

In step S1 it is checked whether there are activation conditions present for undertaking the brake cleaning operation. Activation conditions can include, for example, one or more of the following criteria:
 the vehicle is moving on a level route;
 the vehicle is moving with constant acceleration;
 the vehicle is moving at a minimum speed;
 the brake pedal is not actuated;
 the position of the accelerator pedal does not change by more than a predetermined accelerator pedal change threshold;
 a predetermined time period or a predetermined distance traveled has been reached or exceeded since the end of the last cleaning operation, wherein the predetermined time period or the distance traveled depends in particular on ambient conditions.

If the activation condition is met (alternative: Yes), the method is continued with step S2, otherwise the process jumps back to step S1.

In step S2, the braking pressure is set in accordance with a predetermined braking pressure curve, wherein the braking pressure curve is designed for a cleaning operation and specifies a time profile of a braking pressure to be set with one or more rise phases A1, A2 and one or more plateau phases P1, P2.

The braking pressure curve can predetermine a linear curve with a limited temporal gradient for the rise phases A1, A2, wherein the maximum gradient is selected such that the drive motor can compensate for the braking torque resulting from the increase in the braking pressure. Alternatively, a non-linear, monotonically rising curve of the predetermined braking pressure can also be predetermined by the braking pressure curve. A braking torque is exerted by the braking device 3 in accordance with the braking pressure currently set.

The predetermined braking pressure curve can provide plateau phases P1, P2, which correspond to plateaus of constant braking pressure $P_{Brems}$, in which the braking pressure $P_{Brems}$ is kept constant for a predetermined period of time. Such a braking pressure curve is shown, for example, in FIG. 3. A curve of the braking pressure can be seen $P_{Brems}$ with a ramp-like (linear or other monotonic) rise in the braking pressure of 0 at a time t0 to a first plateau value at a time t1, the plateau value is maintained between the times t1 and t2, a further rise in the braking pressure $P_{Brems}$ between the times t2 and t3, a second instance of keeping the braking pressure $P_{Brems}$ constant between the times t3 and t4 etc.

In step S3, a resulting actual longitudinal acceleration specification of the motor vehicle is measured by the longitudinal acceleration sensor 9.

In step S4, a setpoint motor torque is set by the motor control unit 7 based on the resulting actual longitudinal acceleration specification.

For this purpose a setpoint longitudinal acceleration specification of the motor vehicle, which would be present without braking intervention in step S2, can be determined from a torque specification. In the simplest case, this setpoint longitudinal acceleration specification corresponds to 0 if one of the activation conditions provides for stationary operation of the motor vehicle. The torque specification can, for example, also be predetermined by a position of an accelerator pedal/cruise control (not shown) or are dependent on it, in order in particular to take account of changing torque specifications (accelerator pedal positions) during the cleaning operation. Constant longitudinal accelerations or decelerations can also be predetermined as the setpoint longitudinal acceleration specification. Furthermore, the setpoint longitudinal acceleration specification can correspond to a longitudinal acceleration of the motor vehicle at the time when the cleaning operation is activated.

The motor torque to be set then results as a function of a difference between the setpoint longitudinal acceleration specification and the actual longitudinal acceleration specification, so that the motor vehicle is moved in accordance with the setpoint longitudinal acceleration specification. For this purpose a longitudinal acceleration control can be implemented, which sets a motor torque as a function of a control deviation between the setpoint longitudinal acceleration specification and the actual longitudinal acceleration specification.

In step S5 it is checked whether an actual braking characteristic value corresponds to a predetermined setpoint braking characteristic value. The setpoint braking characteristic value specifies a desired braking behavior, which specifies a braking effect of a cleaned braking device which is not provided with deposits.

The braking characteristic value can specify a ratio between a longitudinal deceleration (difference between the desired longitudinal acceleration specification and the actual longitudinal acceleration specification) or braking torque brought about by a braking effect and a braking pressure $P_{Brems}$ applied thereto. Alternatively, the braking characteristic value can also specify a ratio between a differential motor torque brought about by a braking effect and to be set in addition to the torque specification (difference between the setpoint motor torque to be set and the torque specification from, for example, an accelerator pedal position) and a braking pressure $P_{Brems}$ applied thereto.

If it is found in step S5 that an actual braking characteristic value corresponds to a predetermined setpoint braking characteristic value, possibly taking account of a predetermined tolerance (alternative: yes), it is recognized that the braking device 3, in particular the components thereof, the brake disk 31 and the brake shoes 32a and 32b, are freed of deposits or sufficiently cleaned and the method is continued with step S6 to end the cleaning operation. Otherwise, the method is continued with step S12.

In step S6, the braking pressure $P_{Brems}$ is reduced based on the last recorded value of the braking pressure $P_{Brems}$ in accordance with a predetermined chronological braking pressure reduction curve in a withdrawal phase R until no reduced to 0 bar. In particular, the chronological braking pressure reduction curve can correspond to a linear or other monotonically falling curve of the braking pressure $P_{Brems}$.

Figure 3:
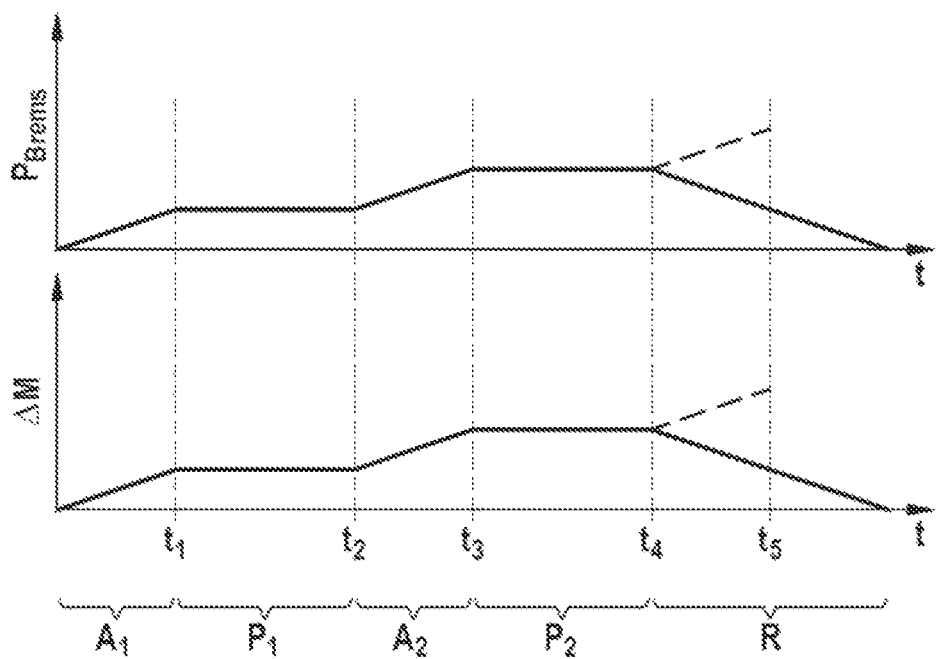
FIG. 3 shows a diagram to illustrate exemplary curves of a braking pressure according to a predetermined braking pressure curve and a differential motor torque.

With reference to FIG. 3, it is determined at the time t4 that the setpoint braking characteristic value has been reached, and from there the braking pressure is reduced to 0 in accordance with a falling ramp in accordance with the predetermined linear braking pressure reduction curve.

In step S7, as in step S3, a resulting actual longitudinal acceleration specification of the motor vehicle is measured, and in step S8, as in step S4, a motor torque is set by the motor control unit 7 based on the resulting actual longitudinal acceleration specification.

If it is determined in step S9 that a braking pressure $P_{Brems}$ of 0 has been reached (alternative. Yes), the cleaning operation is ended and the process jumps back to step S1. Otherwise (alternative: No), a termination condition is checked in step S10.

The termination condition is met if, for example, a change in the actuation of the accelerator pedal and/or an actuation of the brake pedal has been detected. Alternatively, a termination signal received from another vehicle system can bring about termination of the method and meet a termination condition.

If the termination condition is met (alternative: yes), the cleaning operation can be ended immediately and in step S11 the braking pressure can be set to a braking pressure $P_{Brems}$, which no longer brings about a braking torque, or set directly to 0 bar or, when the brake pedal 5 is actuated, set to the value specified by the brake pedal 5. The process then jumps back to step S1.

If it is determined in step S10 that no termination condition is present (alternative. No), the method continues with the reduction of the braking pressure $P_{Brems}$ according to step S6.

In step S12, the termination condition is checked in accordance with the way this is carried out in step S10. If the termination condition is met, the cleaning operation can be ended immediately and in step S13 the braking pressure $P_{Brems}$ can be set to a braking pressure that no longer brings about a braking torque, or set directly to 0 bar or, when the brake pedal is actuated, set to the value specified by the brake pedal. The process then jumps back to step S1.

If it is determined in step S12 that the termination condition is not met (alternative: No), the method of setting the braking pressure to the predetermined braking pressure curve continues with step S2.

The specification of the braking pressure curve can take place adaptively. It can be provided that the plateau values of the plateau phases P1, P2 of the braking pressure $P_{Brems}$ are adapted to the actual braking characteristic value which is set during the preceding rise phase A1, A2. In particular, the plateau value of the first plateau phase P1 can be predetermined and can be variably adapted from the second plateau phase P2 to the determined actual braking characteristic value.

The plateau value for the next plateau phase can in particular be selected as a function of a difference between the actual braking characteristic value and the predetermined setpoint braking characteristic value for a cleaned braking device 3.

The rise phases A1, A2 can be adapted linearly according to a predetermined gradient or according to a predetermined non-linear braking pressure curve. By continuous determination of the actual braking characteristic value, the corresponding plateau phase P1, P2 is started when the corresponding plateau value assigned to the actual braking characteristic has been reached by the actual braking characteristic value. The plateau phase is then maintained for a predetermined period of time.

Alternatively, it can be provided that the plateau value relevant for the next plateau phase P2 is predetermined as a function of an actual braking characteristic value towards the end of the previous plateau phase P1.

Alternatively, depending on the actual braking characteristic value, the duration of the rise phase A1, A2 can also be specified. In this case, with the predetermined braking pressure curve the rise phase A1, A2 is selected to be longer as the actual braking characteristic value decreases.

LIST OF REFERENCE SIGNS

1 Vehicle system
B Braking system
A Drive system
2 Brake control unit
3 Braking device
31 Brake disk
32 a and 32b Brake shoes
4 Brake actuator
5 Brake pedal
6 Brake booster unit
7 Motor control unit
8 Drive motor
9 Longitudinal acceleration sensor

The invention claimed is:

1. A method for carrying out a cleaning operation for at least one braking device of a braking system in a motor vehicle, comprising the following steps:
Setting a braking pressure by components of the braking device in accordance with a predefined braking pressure curve, wherein the braking pressure curve, during the cleaning operation, specifies braking pressures that vary over time for the braking device;
Correcting a setpoint motor torque that is to be provided by a drive motor of the motor vehicle and that is dependent on a braking effect brought about by the set braking pressure;
wherein the setpoint motor torque to be set is corrected by the drive motor of the motor vehicle with the aid of a longitudinal acceleration control, which sets the setpoint motor torque as a function of a deviation between a predefined setpoint longitudinal acceleration specification and an actual longitudinal acceleration specification, wherein the setpoint longitudinal acceleration specification specifies a longitudinal acceleration of the motor vehicle upon activation of the cleaning operation or is determined from an accelerator pedal position during the cleaning operation.

2. The method according to claim 1, in which the brake pressure curve has one or more rise phases with a rising braking pressure and one or more plateau phases each with a constant braking pressure.

3. The method according to claim 2, wherein the one or more plateau phases of the braking pressure curve are each predetermined with a time period between 3 and 10 seconds.

4. The method according to claim 2, wherein the braking pressure curve is provided as a function of an actual braking characteristic value that indicates an instantaneous braking effect in that
a respective plateau value of the braking pressure predetermined by the braking pressure curve during the plateau phases is predetermined as a function of an actual braking characteristic value occurring during the respectively preceding rise phase or an actual braking characteristic value occurring during a respectively preceding plateau phase, or
a duration of a respective plateau phase predetermined by the braking pressure curve is predetermined as a function of an actual braking characteristic value occurring during the respectively preceding rise phase or during a respectively preceding plateau phase, or
a respective plateau value for a next plateau phase of the braking pressure curve and/or the duration thereof is predetermined as a function of a difference between the actual braking characteristic and the predetermined setpoint braking characteristic, which specifies a predetermined braking effect.

5. The method according to claim 1, wherein the cleaning operation can be ended when an actual braking characteristic value which specifies an instantaneous braking effect corresponds to a predetermined setpoint braking characteristic value which specifies a predetermined braking effect.

6. The method according to claim 5, wherein the actual brake characteristic value can be specified by a ratio between a longitudinal deceleration of the motor vehicle brought about by the set braking pressure and a braking pressure applied thereto, or by a ratio between a differential motor torque to be set due to the correction and a braking pressure applied thereto.

7. The method according to claim 1, wherein the cleaning operation is started when one or more activation conditions are present, wherein the activation conditions comprise the following criteria:
the vehicle is moving on a level route;
the vehicle is moving with constant longitudinal acceleration;
the vehicle is moving at a minimum speed;
the brake pedal is not actuated;
the position of an accelerator pedal does not change by more than a predetermined accelerator pedal change threshold value;
a predetermined time period or a predetermined distance traveled has been reached or exceeded since the end of the last cleaning operation, wherein the predetermined time period or the distance traveled depends on ambient conditions.

8. The method according to claim 1, wherein the cleaning operation is ended in that the braking pressure is reduced in accordance with a predetermined chronological braking pressure reduction curve and a longitudinal deceleration brought about by the currently set braking pressure is corrected by the setpoint motor torque to be set by the drive motor (8) of the motor vehicle.

9. The method according to claim 8, wherein the chronological braking pressure reduction curve corresponds to a monotonically linearly falling braking pressure curve up to a braking pressure of 0.

10. The method according to claim 1, wherein the cleaning operation is terminated if one or more termination conditions are present, wherein the termination conditions comprise the following criteria:
the position of an accelerator pedal changes by more than a predetermined accelerator pedal change threshold value;
actuation of a brake pedal is recognized;
a termination signal is received from another vehicle system.

11. A brake control unit for carrying out a cleaning operation for at least one braking device of a braking system in a motor vehicle according to one of the preceding methods, wherein the device is designed to
set a braking pressure by means of components of the braking device in accordance with a predetermined braking pressure curve, wherein the braking pressure curve predetermines braking pressures that vary over time for the braking device; and
provide a cleaning mode signal indicating activating or activation of a cleaning operation;

wherein a setpoint motor torque to be set is corrected by a drive motor of the motor vehicle with the aid of a longitudinal acceleration control, which sets the setpoint motor torque as a function of a deviation between a predefined setpoint longitudinal acceleration specification and an actual longitudinal acceleration specification, wherein the setpoint longitudinal acceleration specification specifies a longitudinal acceleration of the motor vehicle upon activation of the cleaning operation or is determined from an accelerator pedal position during the cleaning operation.

12. A vehicle system for carrying out a cleaning operation for at least one braking device of a braking system in a motor vehicle according to one of the preceding methods, wherein the vehicle system comprises:

the braking system with a brake control unit which is designed to set a braking pressure by means of components of the braking device in accordance with a predetermined braking pressure curve, wherein the braking pressure curve predetermines braking pressures that vary over time for the braking device; and a drive system with a motor control unit which is designed to correct a setpoint motor torque to be set by a drive motor of the motor vehicle in accordance with a braking effect brought about by the set braking pressure;

wherein the setpoint motor torque to be set is corrected by the drive motor of the motor vehicle with the aid of a longitudinal acceleration control, which sets the setpoint motor torque as a function of a deviation between a predefined setpoint longitudinal acceleration specification and an actual longitudinal acceleration specification, wherein the setpoint longitudinal acceleration specification specifies a longitudinal acceleration of the motor vehicle upon activation of the cleaning operation or is determined from an accelerator pedal position during the cleaning operation.

\* \* \* \* \*